June 22, 1965 H. H. LOWELL 3,190,971

SOUND REPRODUCTION APPARATUS

Filed Aug. 17, 1959 2 Sheets-Sheet 1

INVENTOR.
HERMAN H. LOWELL

BY [signature]

ATTORNEY.

June 22, 1965 H. H. LOWELL 3,190,971

SOUND REPRODUCTION APPARATUS

Filed Aug. 17, 1959 2 Sheets-Sheet 2

INVENTOR.
HERMAN H. LOWELL

BY H. E. Whitaker

ATTORNEY.

United States Patent Office 3,190,971

Patented June 22, 1965

3,190,971
SOUND REPRODUCTION APPARATUS

Herman H. Lowell, North Royalton, Ohio
(25 E. Wayne Ave., Silver Spring, Md.)

Filed Aug. 17, 1959, Ser. No. 834,013
6 Claims. (Cl. 179—100.41)

This invention relates to disk recording and reproduction apparatus and more particularly to stylus construction which includes a stylus for guiding and supporting the reproducer cartridge and cartridge arm and a second stylus which in cooperation with the cartridge transduces the mechanical recording into an electrical signal.

One of the important objects of this invention is to provide a stylus for support and guidance of a recorder or reproducer cartridge and cartridge arm and a second stylus independent of the weight and inertia of the cartridge and cartridge arm which functions with the cartridge as the transducer.

The construction of the stylus playback apparatus which has been used prior to my invention relies on the single stylus and groove found in the standard disk recording which imposes on the playback stylus the burden of guidance and support of the tone arm and cartridge. The guidance and support of the tone-arm mass is not related to the re-creation of the original sound through the transduction action of the stylus and cartridge as the stylus follows the configuration of the record groove. To provide the necessary support and guidance, the single playback stylus and stylus attachment must have the necessary rigidity to resist the various parasitic lateral and vertical forces of a massive cartridge and cartridge arm while being moved in accordance with the recorded sound-wave forms formed in a single groove. This results in groove wear as well as diminished fidelity of reproduction.

In existing reproducing heads, stylus tip and groove width minimal dimensions are dictated by the magnitudes of the parasitic load, the vertical load being of the order of two to five grams and the horizontal loads also being substantial. Since the area of support at the stylus tip is extremely small, the steady pressure against the plastic material of the disk recording is of the order of tens of thousands of pounds per square inch. In addition, dynamic pressures are superimposed on such steady forces. Unit pressures of this magnitude cannot be supported by the plastic materials from which the disk records are fabricated without a mechanical breakdown of the groove wall and deterioration of the quality of the recording with each playback. Further, the rate of wear of diamond stylus tips is appreciable and the rate of wear of sapphire stylus tips is intolerably high.

The available reproducing apparatus requires a stylus having a shank of sufficient mass to support the large loads carried thereby. A further decrease in the stylus tip and stylus shank mass cannot be accomplished although such would increase stylus shank compliance necessary to the reproduction of wave forms having frequency components in the vicinity of twenty kilocycles per second. At 33⅓ r.p.m. a 20,000 cycle per second wave form has a crest to crest dimension of about 0.0007 of an inch when impressed in a grove at a radial distance of four inches from the disk center. Under these conditions, a vanishingly small stylus tip radius and corresponding groove width as well as negligible stylus mass, together with nearly complete freedom of motion in the lateral direction, are obvious aims that are now impossible to fulfill.

In order to overcome the many disadvantages of the available stylus playback apparatus, a means of support and guidance of the reproducer cartridge and cartridge arm other than the playback stylus and stylus shank have been provided. Such means consists of a second groove in the recording disk and corresponding stylus and shank in engagement therewith which provides the desired support and guidance for the reproducer cartridge and cartridge arm and allows the playback stylus and shank to function independently of such demands and to transduce with the cartridge the mechanical recording into an electrical signal. The secondary groove which is cut into the master disk at the time of recording is additional to the one bearing the audio-wave form and serves to support and guide through the especially adapted stylus and stylus shank, the reproducer cartridge and cartridge arm. The secondary groove is referred to as the "passive" groove and the cooperating stylus, the "passive" stylus. The transducing stylus is referred to as the "active" stylus, while the groove bearing the audio-wave form is referred to as the "active" groove. By relieving the active stylus of the burden of supporting the loads applied by the cartridge and cartridge arm, greatly increased compliance is achieved since the active stylus can more freely follow the irregular path defined by the active groove.

Accordingly, it is an object of this invention to provide a supporting stylus which will relieve the playback transducer stylus and stylus shank of all parasitic loads.

A still further object of this invention is to provide a tone-arm assembly having a supporting stylus and an active stylus and stylus shank of greatly reduced mass which enhances the compliance with consequent substantial improvement of high frequency response and reduction of all types of distortion.

Another important object of this invention is to provide a reproducer cartridge and cartridge arm having a supporting stylus which reduces the load bearing requirement on the active stylus, thus greatly decreasing the lateral and vertical wear of the active groove and active stylus tip.

A still further object of this invention is to provide a disk reproduction process wherein a fresh, clean, true recording surface is formed on the recording disk in which the cutting tip operates to produce the active groove.

Another object of this invention is to provide a reproduction process in which the mass of the cartridge and tone arm is supported by means other than the pickup stylus which engages a groove having a wave form and is burdened only with the forces necessary to be transmitted to the transducer as determined by the active groove.

Other objects and advantages more or less ancillary to the foregoing, and the manner in which all the various objects are realized, will appear in the following description, which considered in connection with the accompanying drawings, sets forth the preferred embodiment of the invention.

Figure 1:
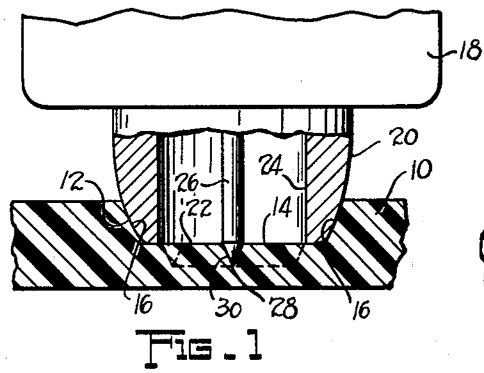
FIG. 1 is an elevational view of a stylus assembly having portions cut away for purposes of better illustration.

Referring first to FIGURE 1, an embodiment of my invention as illustrated therein as it is used with a recording disk 10 of plastic or other conventional materials. The disk 10 has a groove 12 formed therein which has a substantially flat bottom 14 between two upwardly diverging side walls 16. The bottom 14 and the side walls 16 are smooth and the side walls 16 are spaced uniformly throughout the length of the groove. The groove 12 is formed in a continuous spiral from the outer margin of the disk 10 to a point about two inches radially distant from the center of the disk.

A playback cartridge 18 which functions as the transducer is joined to a perforate stylus 20. The diameter of the end of the stylus 20 which engages the groove 12 is slightly less than the spacing of the walls 16 and a planar end 22 of the stylus 20 is perpendicular to the centerline thereof for engagement with the bottom wall 14 of the groove 12. When the stylus 20 is in the groove 12, the cartridge 18 is supported and guided as the disk 10 rotates and the walls 16 position the stylus 20 in the lateral direction.

The stylus 20 has a bore 24 throughout its length through which a needle-like stylus 26 extends to a point beyond the end 22 of the stylus 20. The stylus 26 is joined mechanically to the armature or responsive element of the cartridge 18 at its upper end and has a pointed end 28 which engages a groove 30 cut in the disk 10 in the area between the side walls 16. The groove 30 is cut in an irregular pattern as determined by the sound vibrations to be reproduced and traverses the central portion of the groove 12. The bore 24 has a radial dimension which exceeds slightly the maximum deviation of the groove 30 from the centerline of the groove 12. The stylus 26, being free to move relative to the stylus 20 and in engagement with the groove 30, is shifted laterally by the excursion of the groove 30 from the centerline of the groove 12 which transmits motion to the active portion of the cartridge 18 in conformity with the wave form of the groove 30. The diameter of the stylus 26 is small in relation to the diameter of the stylus 20 and has sufficient strength to transfer motion to the cartridge 18 produced by the lateral deflection of the groove 30.

Figure 2:
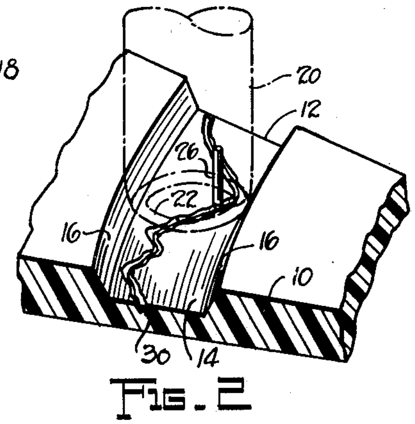
FIG. 2 is a perspective view of the stylus and disk.
Figure 3:
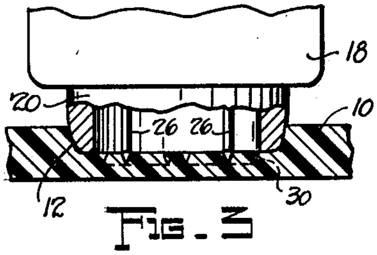
FIG. 3 is an elevational view with parts cut away showing a stylus and disk arrangement having two sound grooves for simultaneous playback.

In FIGURE 2, the groove 30 is shown as it would appear when formed in the bottom of the groove 12. In FIGURE 3, a single inactive or supporting stylus 20 carries the cartridge 18 and a pair of active styli 26 engages a pair of grooves 30. This form would find usefulness in stereophonic transcriptions wherein a separate stylus and groove is available for each reproduction channel.

Figure 4:
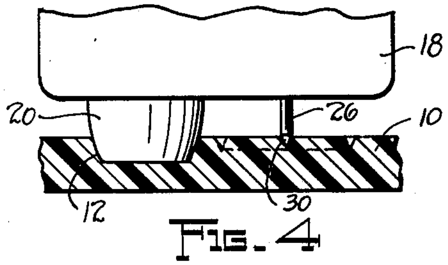
FIG. 4 is an elevational view of a second form of the invention.
Figure 5:
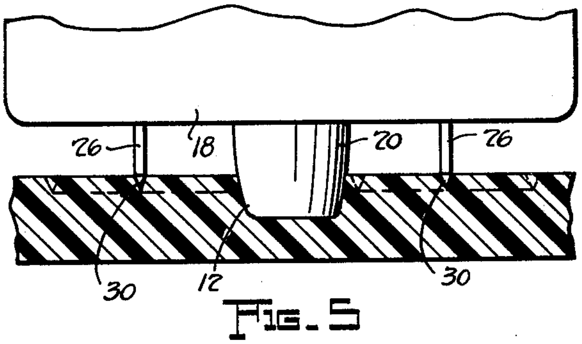
FIG. 5 is an elevational view of an assembly similar to FIG. 4 having a stylus for each of two sound-reproducing grooves.

In FIGURE 4, a modification is illustrated wherein the inactive stylus 20 engages an inactive groove 12 and carries the cartridge 18. The active groove 30 is disposed to one side of the inactive groove 12 and is formed in the surface of the disk 10 for engagement by the active stylus 26. In FIGURE 5, the inactive groove 12 is located between a pair of active grooves 30 and receives the inactive stylus 20 which supports and guides a cartridge 18. A pair of styli 26 are in engagement with each groove 30, respectively; thus, providing two-channel reproduction as would be found in stereophonic techniques.

Figure 6:
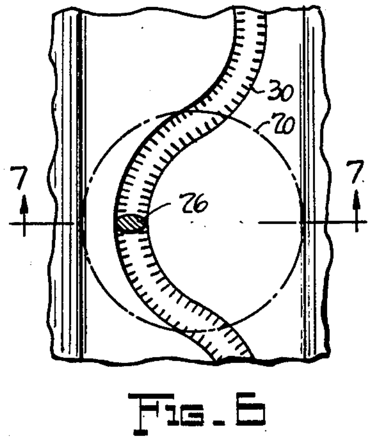
FIG. 6 is a plan view.
Figure 7:
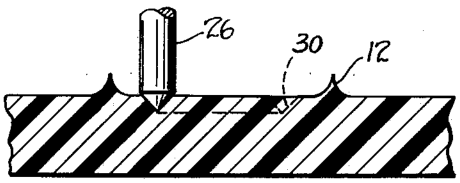
FIG. 7 is a fragmentary sectional view taken along line 7—7 of FIG. 6.

An active stylus 26 of minimum mass is illustrated in FIGURE 6 and is of eliptical cross section. Since the maximum forces are in a lateral direction, the major axis of the stylus cross section is in a lateral direction. The eliptical shape more nearly conforms to the shape of the cutting stylus and results in reduced pinching at points of sharp curvature in the active groove 30. In FIGURES 6 and 7 the ninety-degree stereophonic-type groove is illustrated wherein modulations from one channel are impressed on one side of the groove 30 and the modulations from a second channel are impressed on the opposite side of the groove 30.

Figure 8:
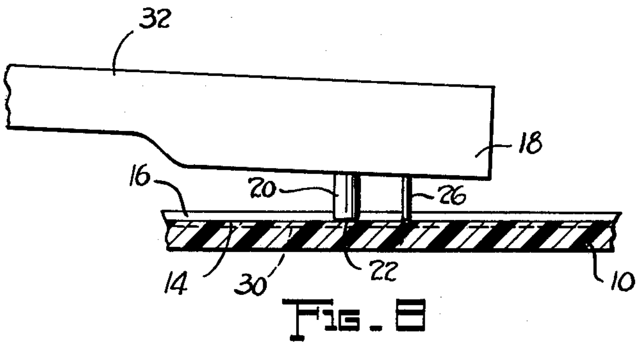
FIG. 8 is an elevational view of a portion of a tone arm having the active stylus forward of the passive stylus; and, FIG. 9 is a fragmentary perspective view showing the stylus arrangement of FIG. 8.
Figure 9:
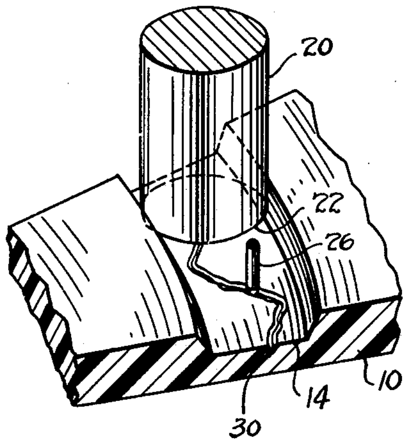

The preferred embodiment of my invention is illustrated in FIGURES 8 and 9 wherein the active stylus 26 is positioned forward of the passive stylus 20 in respect to the playback cartridge 18 carried by a tone arm 32. In this modification the active groove may be cut in the passive groove bottom wall 14 with excursions to the full width of the passive groove. This form also provides additional latitude in respect to the design and location of transducer elements that function with the active stylus 26.

In operation the passive stylus 20 affixed to the cartridge 18 travels along the groove 12 and supports the weight of the cartridge 18 and the tone-arm structure 32 on the bottom 14 of the groove 12. The side 16 of the groove provides lateral control of the position of the cartridge 18 and maintains a constant geometric relationship between the position of the cartridge 18 relative to the groove 12. The active stylus 26, in engagement with the active groove 30, is of low mass relative to the inactive stylus 20 since it does not carry the weight of the cartridge 18 and does not absorb the lateral inertial forces of the reproduction apparatus. The active stylus 26 moves freely and is able to shift laterally as dictated by the excursions of the active groove 30. The unrestrained movement of the active stylus 26 cooperates with the cartridge 18 to provide transduction of the wave form impressed in the record disk to electrical modulations of a high degree of fidelity.

Having thus described this invention in such full, clear, concise, and exact terms as to enable any person skilled in the art to which it pertains to make and use the same, and having set forth the best mode contemplated of carrying out this invention, I state that the subject which I regard as being my invention is particularly pointed out and distinctly claimed in what is claimed, it being understood that equivalents or modifications of, or substitutions for, parts of the above specifically described embodiments of the invention may be made without departing from the scope of the invention as set forth in what is claimed.

What is claimed is:

1. In a disk recording playback apparatus having a transducer cartridge and a recording disk with a spiral wall uniformly spaced formed on the surface of the disk and a groove in the disk having irregularities which relate to an audio-wave form, a stylus in engagement with the disk and confronting faces of successive spirals of the wall, said stylus being affixed to said cartridge, and a second stylus connected to an electrically responsive element in said cartridge and engaging said groove, said groove being positioned between confronting faces of said spiral wall.

2. In a disk recording playback apparatus having a transducer cartridge and a recording disk with a spiral wall uniformly spaced formed on the surface of the disk and a groove in the disk having irregularities which relate to an audio-wave form, a hollow stylus having a planar end for engagement with the disk and confronting faces of successive spirals of the wall, said stylus being affixed to said cartridge, and a second stylus projecting through and co-axial with the first stylus and connected to an electrically responsive element in said cartridge and engaging said groove.

3. A transducer for producing a varying voltage in an electrical circuit which is a function of irregularities in a groove formed in a recording disk, said disk having uniformly spaced walls in a spiral pattern, said groove being formed between said walls, said transducer comprising a voltage-producing element actuated by movement, a stylus connected to said element and engaging said groove, a cartridge for containing said element and holding non-moving parts, and a second stylus connected to said cartridge and engaging said disk and said walls for supporting and guiding said transducer as said disk is rotated, said second stylus being perforate, said first stylus projecting through and co-axial with said second stylus.

4. A transducer for producing a varying voltage in an electrical circuit which is a function of irregularities in a groove formed in a recording disk, said disk having uniformly spaced walls in a spiral pattern, said groove being formed between said walls, said transducer comprising a voltage-producing element actuated by movement, a stylus connected to said element and engaging said groove, a cartridge for containing said element and holding non-moving parts, and a second stylus connected to said cartridge and engaging said disk and said walls for supporting and guiding said transducer as said disk is rotated, said second stylus being hollow and having a planar end.

5. A transducer for producing a varying voltage in an electrical circuit which is a function of irregularities in a groove formed in a recording disk, said disk having uniformly spaced walls in a spiral pattern, said groove being formed in the area between said walls, said transducer comprising a voltage-producing element actuated by movement, a stylus being mechanically joined to said element and engaging said groove, a cartridge for containing said element and holding non-moving parts, and a second stylus connected to said cartridge and engaging said disk and said walls for supporting and guiding said transducer as said disk is rotated.

6. In a disk recording apparatus having a transducer cartridge and a recording disk with a spiral wall uniformly spaced formed on the surface of the disk and a groove in the disk having irregularities which relate to an audio-wave form, a stylus in engagement with the disk and confronting faces of successive spirals of the wall, said stylus being affixed to said cartridge, and a second stylus positioned forwardly of said first stylus in respect to said groove and connected to an electrically responsive element in said cartridge, said second stylus having one end in engagement with said groove, said groove being positioned between confronting faces of said spiral wall.

References Cited by the Examiner

UNITED STATES PATENTS

| | | | |
|---|---|---|---|
| 671,513 | 4/01 | Goold | 274—13.1 |
| 1,444,960 | 2/23 | Emerson | 274—42 |
| 2,247,640 | 7/41 | Nielsen | 179—100.41 |

IRVING L. SRAGOW, *Primary Examiner.*

L. MILLER ANDRUS, STEPHEN W. CAPELLI, JOHN P. WILDMAN, *Examiners.*